Patented Mar. 13, 1951

2,545,200

UNITED STATES PATENT OFFICE 2,545,200

METHOD OF PREPARING SKIATRONIC SCREENS

Gorton R. Fonda, Schenectady, N. Y., assignor to the United States of America as represented by the Secretary of the Navy No Drawing. Application October 24, 1945, Serial No. 624,337

6 Claims. (Cl. 117—33.5)

The present invention relates to cathode ray devices of the skiatron type; that is, cathode ray devices containing screens or films of alkali halide, for example potassium chloride, on which the impingement of a cathode ray (electron) beam causes a coloration. Such tubes also are referred to as "dark trace" tubes. It is the object of my invention to improve the screens of such device.

When a halide, for example potassium chloride, is vaporized in a good vacuum a translucent white film is deposited. It is homogeneous and uniform in structure, the whiteness or translucence apparently being due to a crystalline condition of the halide constituting the film. When, however, such a film is deposited by vaporization in the presence of a low pressure gas or vapor the film is clear or transparent as though the halide were present in the glassy state, such as characterizes an undercooled liquid.

In accordance with my present invention improved halides, films or screens whereon higher contrast of dark traces with respect to the background is obtainable are provided. Such screens are prepared in two stages. In accordance with one procedure, a halide film in part is deposited on the glass and wall of a cathode ray tube, or other suitable foundation surface, by vaporization of the halide in an attenuated gas or vapor at such pressures that the halide condenses on the supporting surface, as I have found, in a transparent state. In one of the modifications of my invention an initial deposition of halide is carried out in a vacuum.

In a second operation the structural condition of the resulting halide foundation layer is modified by appropriate treatment whereby the film is conditioned to respond to electron bombardment with greater contrast intensity. For example, such conditioning may be carried out either by contact with a vapor or by disposition of a second layer of halide upon a transparent foundation layer under conditions resulting in translucence; that is, a white appearance of the resulting layer.

In accordance with one procedure for carrying out my invention, an initial clear layer first is deposited by vaporization of the desired halide in a suitable gas, for example nitrogen or air, or in a suitable vapor, such as the vapor of water, alcohol or benzol. Although the clear film is formed at pressures that may extend up to several millimeters, it is nevertheless desirable for the purpose of attaining the aim of this invention that the pressure of the gas or vapor ordinarily should not substantially exceed 100 microns. A pressure of gas or vapor of 20 to 60 microns is preferable. The resulting film obtained in this first step is transparent or clear.

A second layer of halide is superimposed on such clear layer by condensation thereon of vaporized halide in a good vacuum; that is, when the residual pressure is so low as to be negligible and ordinarily less than one-tenth of a micron. This results in the formation of a white, translucent film.

If the initial clear layer was deposited in a gas or vapor at a pressure lying in the upper part of the range specified, then the entire material of this initial layer is crystallized and whitened by vaporizing upon it in a vacuum only a very small additional amount of halide. If, on the other hand, the initial clear layer was deposited in a gas or vapor at lower parts of the pressure range, then it is necessary, as a means of obtaining sufficient whitening, to vaporize upon this in vacuum a considerably heavier layer of halide because the layer which was initially clear appears in this case not to have become completely crystallized.

In accordance with another procedure for carrying out the present invention a clear or transparent film is produced by vaporization of the desired halide in the presence of attenuated gas, as previously explained. Thereupon water vapor is admitted to the envelope and permitted to diffuse into contact with the transparent film. The pressure of the water vapor, the length of time of treatment, that is the period of contact of the vapor with the film, and other conditions may be varied to produce desired results.

In the case of such moisture treated films, desirable results have been obtained by first vaporizing the halide, not in a gas or vapor as described above, for the purpose of forming a clear film, but rather in a vacuum and by forming thereby a crystallized and whitened film. When this film is treated with moisture under appropriate conditions, a modified crystallinity results which shows an even greater increase in the intensity of dark trace.

Good results are obtainable by admitting water vapor at 4.6 to 9.5 millimeters of mercury pressure, this being the vapor pressure of water within the temperature range of 0° to 10° C. The time of treatment may be about five minutes and, in any event, no more than about thirty minutes.

Not only is the intensity of dark trace increased greatly by the vapor treatment, rising under optimum conditions of treatment to double the normal intensity, but the period of decay or persistence of the dark trace also is greatly lengthened. When the treatment is carried out under still higher pressures of moisture, the intensity of dark trace attainable decreases from its optimum value but the persistence continues to increase. At 12.8 millimeters of mercury pressure of the vapor (corresponding to 15° C.), for instance, the intensity has fallen to the normal value characterizing untreated films, but the persistence is increased threefold. In place of water vapor, other vapor, as for example alcohol vapor, may be used to whiten the surface of a transparent film or to modify a normal film for the purpose of obtaining a higher intensity or a longer persistence of the dark trace.

Whenever it is desired to obtain simply a higher intensity of dark trace without extending the persistence unduly, a foreign halide, for example, magnesium chloride, may be added to the potassium chloride, as described and claimed in my copending application Serial No. 482,025, filed April 6, 1943, and now Patent No. 2,435,435. Magnesium chloride, or equivalent chloride, to the extent of a few per cent to several per cent by weight is fused with the halide of an alkali metal at a temperature not substantially exceeding the melting point until a clear quiescent fusion results. Upon cooling the product is comminuted, pressed into pellets and vaporized to produce a desired film in a cathode ray tube.

After treatment with water or alcohol vapor, the residual vapors are of course pumped out in order that there may be a vacuum of the usual high degree present in the cathode ray tube. The film retains only an extremely small amount, if any, of the vapor with which it was treated. It is desirable, however, that heat treatment of the tube during this final pumping out be restricted as far as possible.

What I claim as new and desire to secure by Letters Patent of the United States is:

1. The method of preparing skiatronic screens consisting essentially of a first step of condensation on the glass and walls of a cathode ray tube of a film of potassium chloride from a vapor thereof in the presence of an attenuated gas at a pressure of from 20 to about 100 microns of mercury and a second step of condensation of an additional layer of potassium chloride on said film of potassium chloride in the presence of water vapor at a pressure of from 4.6 to about 9.5 millimeters of mercury whereby said first applied film is transparent, the composite film structure after application of said additional layer of potassium chloride is translucent and is characterized by a relatively sharp contrast between the shadow of the image developed thereon and the background.

2. The method of preparing skiatronic screens as defined in claim 1 wherein said attenuated gas is nitrogen.

3. The method of preparing skiatronic screens as defined in claim 1, wherein said attenuated gas is air.

4. The method of preparing skiatronic screens as defined in claim 1 wherein said attenuated gas is water vapor.

5. The method of preparing skiatronic screens as defined in claim 1 wherein said attenuated gas is alcohol vapor.

6. The method of preparing skiatronic screens as defined in claim 1 wherein said attenuated gas is benzol vapor.

GORTON R. FONDA.

REFERENCES CITED

The following references are of record in the file of this patent:

UNITED STATES PATENTS

| Number | Name | Date |
|---|---|---|
| 2,008,874 | Olpin | July 22, 1935 |
| 2,355,110 | Rosenthal | Aug. 8, 1944 |